US011055277B2

(12) United States Patent
Yang

(10) Patent No.: US 11,055,277 B2
(45) Date of Patent: Jul. 6, 2021

(54) INTEGRITY VERIFICATION METHOD, APPARATUS, AND SYSTEM AND DEVICE FOR DATA IN A BLOCKCHAIN-TYPE LEDGER

(71) Applicant: Advanced New Technologies Co., Ltd., George Town (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/815,902

(22) Filed: Mar. 11, 2020

(65) Prior Publication Data
US 2020/0210407 A1 Jul. 2, 2020

Related U.S. Application Data

(63) Continuation of application No. PCT/CN2020/071219, filed on Jan. 9, 2020.

(30) Foreign Application Priority Data

Apr. 4, 2019 (CN) .......................... 201910273141.3

(51) Int. Cl.
*G06F 16/23* (2019.01)
*H04L 9/06* (2006.01)
*G06F 16/28* (2019.01)

(52) U.S. Cl.
CPC .......... *G06F 16/2365* (2019.01); *G06F 16/28* (2019.01); *H04L 9/0637* (2013.01); *H04L 2209/38* (2013.01)

(58) Field of Classification Search
CPC ............................ G06F 16/2365; G06F 16/28
See application file for complete search history.

(56) References Cited

U.S. PATENT DOCUMENTS 9,652,389 B2 5/2017 Vekiarides et al.
2016/0191243 A1* 6/2016 Manning ................. H04L 9/321
713/168

(Continued)

FOREIGN PATENT DOCUMENTS

CN 107247773 10/2017
CN 107657438 2/2018

(Continued)

OTHER PUBLICATIONS

U.S. Appl. No. 16/815,882, Yang, filed Mar. 11, 2020.

(Continued)

*Primary Examiner* — Pierre M Vital
*Assistant Examiner* — Andrew N Ho
(74) *Attorney, Agent, or Firm* — Fish & Richardson P.C.

(57) ABSTRACT

Computer-implemented methods, non-transitory, computer-readable media, and computer-implemented systems for data verification are provided. When a blockchain-type ledger needs to be verified, integrity verification can be first performed on block headers in a coordinator node only. After the verification succeeds, a second verification instruction can be further distributed to data nodes, so that the data nodes perform data block internal verification in parallel.

20 Claims, 5 Drawing Sheets

(56) References Cited

U.S. PATENT DOCUMENTS

| | | | |
|---|---|---|---|
| 2017/0236120 A1* | 8/2017 | Herlihy | G06F 21/57 |
| | | | 705/67 |
| 2018/0039667 A1* | 2/2018 | Pierce | G06F 16/2379 |
| 2018/0107703 A1* | 4/2018 | Sharp | G06F 16/2379 |
| 2018/0374173 A1* | 12/2018 | Chen | H04L 9/3236 |
| 2019/0018984 A1* | 1/2019 | Setty | H04L 63/14 |
| 2019/0034465 A1* | 1/2019 | Shimamura | G06F 16/2474 |
| 2019/0036932 A1 | 1/2019 | Bathen et al. | |
| 2019/0199516 A1* | 6/2019 | Carver | H04L 9/3297 |
| 2020/0076603 A1* | 3/2020 | Li | H04L 9/3218 |

FOREIGN PATENT DOCUMENTS

| | | |
|---|---|---|
| CN | 107909369 | 4/2018 |
| CN | 108563771 | 9/2018 |
| CN | CA 108961052 | 12/2018 |
| CN | CA 109242500 | 1/2019 |
| CN | 109691008 | 4/2019 |
| CN | CA 110147685 | 8/2019 |
| WO | WO-2018067232 A1 * | 4/2018 ........... H04L 9/3239 |

OTHER PUBLICATIONS

U.S. Appl. No. 16/815,893, Yang, filed Mar. 11, 2020.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No_ PCT/CN2020/071219, dated Apr. 10, 2020, 18 pp. (with machine translation) X.

* cited by examiner

| Field name | Field type | Field description |
|---|---|---|
| Hash | h256 | Hash value of a data block |
| Version | Uint32_t | Version number |
| Number | Uint64_t | Block height |
| Parent_hash | h256 | Hash value of a parent data block |
| Tx_root | h256 | Merkle tree root hash of a transaction in a block body |
| Time_stamp | Uint64_t | Timestamp |

INTEGRITY VERIFICATION METHOD, APPARATUS, AND SYSTEM AND DEVICE FOR DATA IN A BLOCKCHAIN-TYPE LEDGER

CROSS-REFERENCE TO RELATED APPLICATIONS

This application is a continuation of PCT Application No. PCT/CN2020/071219, filed on Jan. 9, 2020, which claims priority to Chinese Patent Application No. 201910273141.3, filed on Apr. 4, 2019, and each application is hereby incorporated by reference in its entirety.

TECHNICAL FIELD

Implementations of the present specification relate to the field of information technologies, and in particular, to data verification methods, apparatuses, and systems, and devices.

BACKGROUND

Each data block needs to be verified in a block generation sequence, so as to complete integrity verification on a partial or full blockchain-type ledger that stores data based on a blockchain data structure (e.g., in a form of a blockchain). However, when a blockchain-type ledger to be verified has many data blocks and many data records in the data blocks, verification efficiency is relatively low.

Based on this, a more efficient data verification method is needed for a blockchain-type ledger.

SUMMARY

An objective of implementations of the present application is to provide methods for implementing efficient data verification in a blockchain-type ledger.

To alleviate the previous technical problem, the implementations of the present application are implemented as follows:

A data verification method is applied to a database system that stores blockchain-type ledgers in a centralized manner. The database system includes a coordinator node and data nodes, and the method includes the following: receiving, by the coordinator node, a first verification instruction, and determining a target ledger that is to be verified, and performing block header integrity verification on block headers of data blocks in the target ledger based on block header information stored in the coordinator node, where the target ledger includes a partial ledger or a full ledger; if the block header integrity verification succeeds, determining a target data node corresponding to each data block in the target ledger based on routing information between a data block and a data node stored in the coordinator node; sending a second verification instruction to the target data node, where the second verification instruction includes a data block identifier; receiving, by the data node, the second verification instruction, performing block body integrity verification on a data block corresponding to the data block identifier, generating a verification result, and returning the verification result to the coordinator node; and receiving, by the coordinator node, the verification result, and determining integrity of the target ledger; where in the blockchain-type ledgers, a data block includes a block header used to store metadata and a block body used to store a data record; and except an initial data block, each data block includes at least one data record and includes its own block hash value that is determined by both the data record included in the data block and a hash value of a previous data block, and block heights of data blocks are increased monotonically based on a block generation time sequence.

A data verification system is applied to a database system that stores blockchain-type ledgers in a centralized manner. The database system includes a coordinator node and data nodes, where the coordinator node receives a first verification instruction, and determines a target ledger that is to be verified, and performs block header integrity verification on block headers of data blocks in the target ledger based on block header information stored in the coordinator node, where the target ledger includes a partial ledger or a full ledger; if the block header integrity verification succeeds, the coordinator node determines a target data node corresponding to each data block in the target ledger based on routing information between a data block and a data node stored in the coordinator node; the coordinator node sends a second verification instruction to the target data node, where the second verification instruction includes a data block identifier; the data node receives the second verification instruction, performs block body integrity verification on a data block corresponding to the data block identifier, generates a verification result, and returns the verification result to the coordinator node; and the coordinator node receives the verification result, and determines integrity of the target ledger; where in the blockchain-type ledgers, a data block includes a block header used to store metadata and a block body used to store a data record; and except an initial data block, each data block includes at least one data record and includes its own block hash value that is determined by both the data record included in the data block and a hash value of a previous data block, and block heights of data blocks are increased monotonically based on a block generation time sequence.

A data verification method is applied to a coordinator node in a database system that stores blockchain-type ledgers in a centralized manner. The method includes: receiving a first verification instruction, and determining a target ledger that is to be verified, and performing block header integrity verification on block headers of data blocks in the target ledger based on block header information stored in the coordinator node, where the target ledger includes a partial ledger or a full ledger; if the block header integrity verification succeeds, determining a target data node corresponding to each data block in the target ledger based on routing information between a data block and a data node stored in the coordinator node; sending a second verification instruction to the target data node, where the second verification instruction includes a data block identifier; and receiving a verification result returned by the target data node for the data block, and determining integrity of the target ledger based on the verification result.

A data verification apparatus is applied to a coordinator node in a database system that stores blockchain-type ledgers in a centralized manner. The apparatus includes: a block header verification module, configured to receive a first verification instruction, and determine a target ledger that is to be verified, and perform block header integrity verification on block headers of data blocks in the target ledger based on block header information stored in the coordinator node, where the target ledger includes a partial ledger or a full ledger; a determining module, configured to, if the block header integrity verification succeeds, determine a target data node corresponding to each data block in the target ledger based on routing information between a data block and a data node stored in the coordinator node; a sending module, configured to send a second verification instruction to the target data node, where the second verification instruction includes a data block identifier; and a receiving module, configured to receive a verification result returned by the target data node for the data block, and determine integrity of the target ledger based on the verification result.

According to the solutions provided in the implementations of the present specification, when a blockchain-type ledger needs to be verified, integrity verification can be first performed on block headers in a coordinator node only, and after the verification succeeds, a second verification instruction can be further distributed to data nodes, so that the data nodes perform data block internal verification in parallel, thereby greatly improving verification efficiency.

It should be understood that the previous general description and the following detailed description are merely exemplary and illustrative, and cannot limit the implementations of the present specification.

In addition, there is no need for any implementation of the present specification to achieve full effects described above.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

FIG. 2 is a schematic diagram illustrating a block header, according to an implementation of the present specification;

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

The technical solutions provided in the implementations of the present specification are described in detail below with reference to the accompanying drawings.

Figure 1:
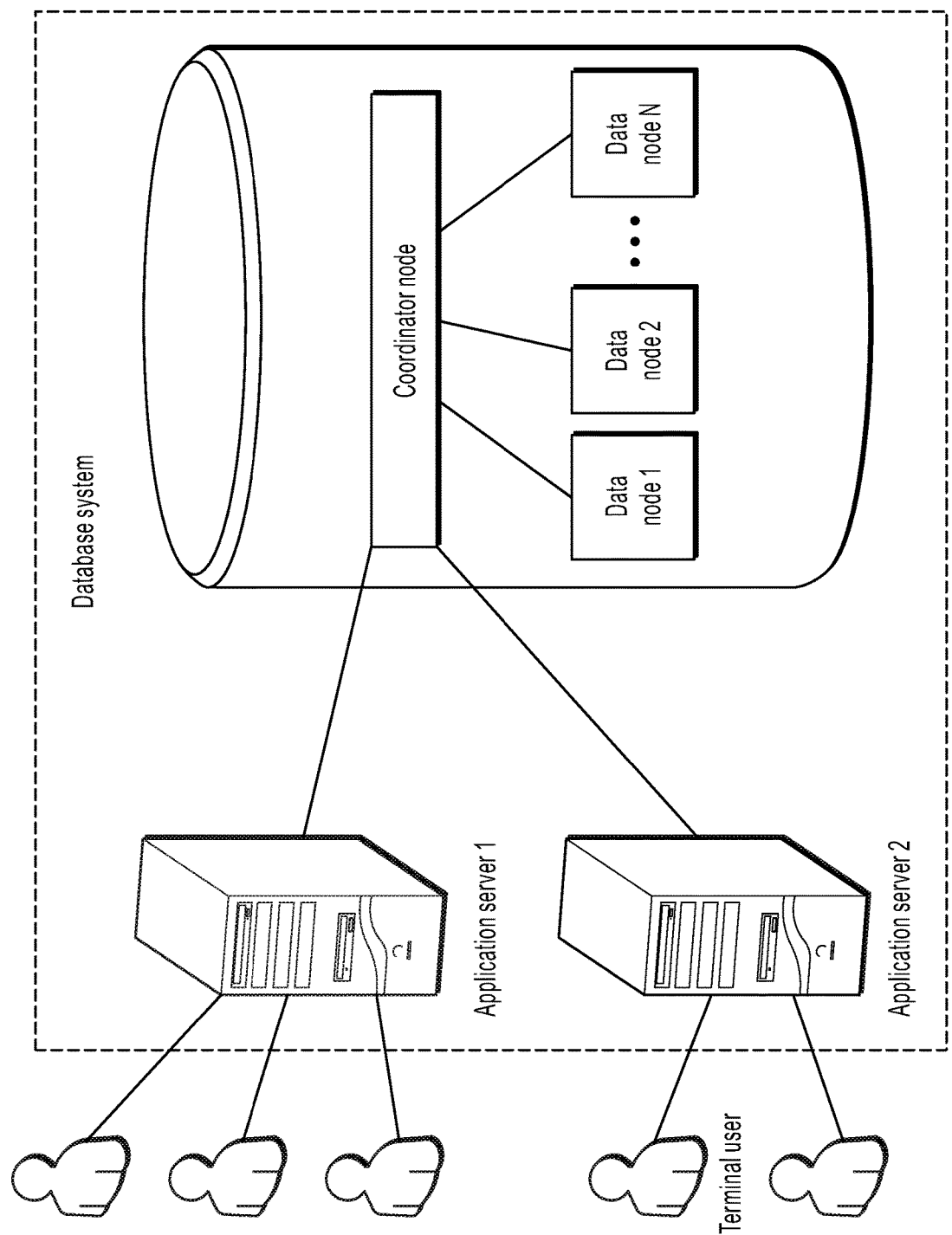
FIG. 1 is a schematic diagram illustrating a system architecture involved in an implementation of the present specification.

First, notably, a database system in the present specification provides a data service in a centralized manner. In a current server architecture, a database server can directly interconnect to a client device of an individual user; or some application servers can interconnect to client devices of individual users, while a database server interconnects to the application servers. In the database system involved in the implementation of the present specification, one coordinator node can correspond to multiple data nodes. FIG. 1 is a schematic diagram illustrating a system architecture involved in the implementation of the present specification.

A data block can be generated in advance in the centralized database system in the implementation of the present specification in the following way:

A data record to be stored is received, and a hash value of each data record is determined. The data record to be stored can be various consumption records of a client device of an individual user, or can be a service result, an intermediate state, or an operation record, etc. that is generated when an application server executes service logic based on an instruction of the user. A specific service scenario can include a consumption record, an audit log, a supply chain, a government supervision record, and a medical record, etc.

When a predetermined block generation condition is reached, each data record to be written into a data block is determined and the Nth data block that includes a hash value of the data block and the data record is generated.

The predetermined block generation condition includes the following: a quantity of data records to be stored reaches a quantity threshold, for example, one new data block is generated each time a quantity of received data records reaches 1000, and the 1000 data records are written into the block; or a time interval from a previous block generation moment reaches a time threshold, for example, one new data block is generated every 5 minutes, and data records received in the 5 minutes are written into the block.

N here refers to a sequence number of a data block. In other words, in the implementation of the present specification, the data blocks are arranged in a blockchain-based form in a block generation time sequence, and have a strong time sequence characteristic. Block heights of the data blocks are increased monotonically based on the block generation time sequence. A block height can be a sequence number. In this case, a block height of the Nth data block is N. The block height can also be generated by using another method.

When N=1, the data block is an initial data block. A hash value and a block height of the initial data block are given based on a predetermined method. For example, if the initial data block does not include a data record, the hash value is any given hash value, and the block height blknum is equal to 0. For another example, a trigger condition for generating the initial data block is the same as a trigger condition for another data block, but the hash value of the initial data block is determined by performing a hash operation on all content in the initial data block.

When N>1, because content and a hash value of a previous data block are already determined, a hash value of a current data block (the Nth data block) can be generated based on the hash value of the previous data block (that is, the (N−1)th data block). For example, in a feasible method, a hash value of each data record to be written into the Nth data block is determined, and a Merkle tree is generated based on a sequence of the data records in the block. Then, a root hash value of the Merkle tree is combined with the hash value of the previous data block to generate the hash value of the current block by using a hash algorithm again.

In addition, the hash value of the current block can further be generated based on the root hash value of the Merkle tree and some other metadata (for example, a version number, a generation timestamp of the data block, or a parent data block hash).

For another example, combination can be performed based on a sequence of the data records in the block and a hash operation can be performed to obtain a hash value of the overall data records. Then, the hash value of the previous data block is combined with the hash value of the overall data records, and a hash operation is performed on a string obtained through the combination to generate the hash value of the data block.

Each data block includes a block header used to store metadata and a block body used to store a data record. The block header in the data block can be used to store, for example, a parent hash, a block hash value of the data block, a version number, a root hash of a data record, and a timestamp, etc. FIG. 2 is a schematic diagram illustrating a block header, according to an implementation of the present specification. Certainly, a format of the block header can be customized based on a service requirement, and can further include some other information, for example, a status array used to describe a status of a data record. The block body is used to store plaintext of a data record or a hash value of a data record.

In the previously described data block generation method, each data block can be determined by using a hash value, and the hash value of the data block can be determined by content and a sequence of data records in the data block and the hash value of the previous data block. A user can initiate verification at any time based on a hash value of a data block. Modification to any content in the data block (including modification to content or a sequence of data records in the data block) causes inconsistency between a hash value of the data block that is calculated during verification and a hash value obtained when the data block is generated. Consequently, the verification fails and tamper-resistance can be implemented in the centralized manner.

Notably, the previously described data block generation can be implemented in or not in the coordinator node. For example, the database system can further include another service node, which is specifically configured to handle data block generation, so as to implement service decoupling. Once a data block is generated, the service node sends the data block to the coordinator node.

After obtaining the data block, the coordinator node in the database system needs to store the data block. An implementation of the present specification provides a data storage method applied to a database system. The process specifically includes the following steps.

S201: A coordinator node obtains a generated data block, determines a data node corresponding to the data block based on a block hash value of the data block, allocates the data block to the corresponding data node, creates routing information between the data block and the data node, and saves the routing information and block header information of the data block.

There are generally multiple data nodes in the database system. For this reason, the coordinator node first needs to determine which data node that a data block should be allocated to. Specifically, the coordinator node can perform the allocation based on a hash value of the data block.

As described above, the hash value of the data block can be obtained through calculation based on both a parent hash and a hash of a data record of the data block, and can be stored in a block header. Hash values (hash values) are obtained by using a hash function (hash function). Supported algorithms include MACTripleDES, MD5, RIPEMD160, SHA1, SHA256, SHA384, and SHA512, etc. In short, a block hash value of a data block is a relatively short string, and can uniquely identify the data block. A small change to any content in the data block causes a large change to the hash value of the data block.

A quantity of data nodes is generally fixed, and each data node can correspond to a serial number. Therefore, the hash value can be converted into a corresponding numerical value, and a modulo operation can be performed on the quantity of data nodes. As such, the data node corresponding to the data block can be determined based on a modulo result.

For example, if a block hash value of a data block is converted into a numerical value 100110120, and there are totally 10 data nodes numbered from 0 to 9, it can be determined that a modulo result for the block hash value is 0, tree node 0 is a data node corresponding to the block hash value, and the data block can be sent to data node 0 for storage.

Because a block hash value of a data block generally has hundreds of places (a quantity of places is determined based on a hash algorithm), a specified quantity of places (for example, last three places) can be selected from the block hash value for numerical value conversion, so that a modulo operation can be performed to determine a data node corresponding to the data block, thereby reducing a calculation amount.

For another example, all data nodes can also be arranged on an end-to-end hash ring, for example, a hash ring with a size from 0 to $2^{32}$. Each node can be located at a certain point on the hash ring based on a hash value corresponding to an address or a device identifier of the data node. Each block hash value can be located at a certain location on the hash ring based on the same principle, so that a data node appearing first in a clockwise or counterclockwise direction can be used as a data node corresponding to the block hash value.

After a data node corresponding to a data block is determined, a piece of routing information related to the data block can be created and written into a routing table in the coordinator node. Specifically, a routing table can be locally stored and include information such as a data block height, a data block hash, and a data node serial number corresponding to a data block.

In addition, the coordinator node also needs to store block header information of each data block in addition to storing the routing information.

S203: The data node receives and stores the data block sent by the coordinator node.

In the solutions provided in the implementations of the present application, a routing relationship between a data block and a data node is established by using a block hash of the data block, a blockchain-type ledger is stored in a distributed manner at a level of granularity of data block, and metadata such as block header information is stored in a coordinator node. As such, storage load of a single node device can be reduced, and it is conducive to performing operations such as query and verification through multiple processes, thereby improving efficiency and bringing more convenience.

For example, assume that there are N data nodes, and data blocks are approximately evenly distributed on the data nodes. According to the solutions provided in the implementations of the present specification, when full verification needs to be performed on a ledger, data block internal verification can be allocated to the N data nodes for implementation, which is N times more efficient than conventional serial verification performed from beginning to end.

In a target data node, a data block identifier can be a block height included in a block header or a data block hash. In an implementation, the coordinator node can further send only a block body of a data block and an identifier to a data node. In this case, the data node can only need to store the block body, the block body identifier, and information used for verification. There can be multiple types of data block identifiers, for example, a block height of a data block, and/or a block hash of a data block. In such a method, the routing information in the coordinator node includes a block body identifier and a data node serial number. The previously mentioned method can reduce data transmission overheads of the coordinator node and save storage space of the data node. The information used for verification refers to information used to verify integrity of the data block, and can include a hash value of the data block and a hash value of a parent data block.

Figure 3:
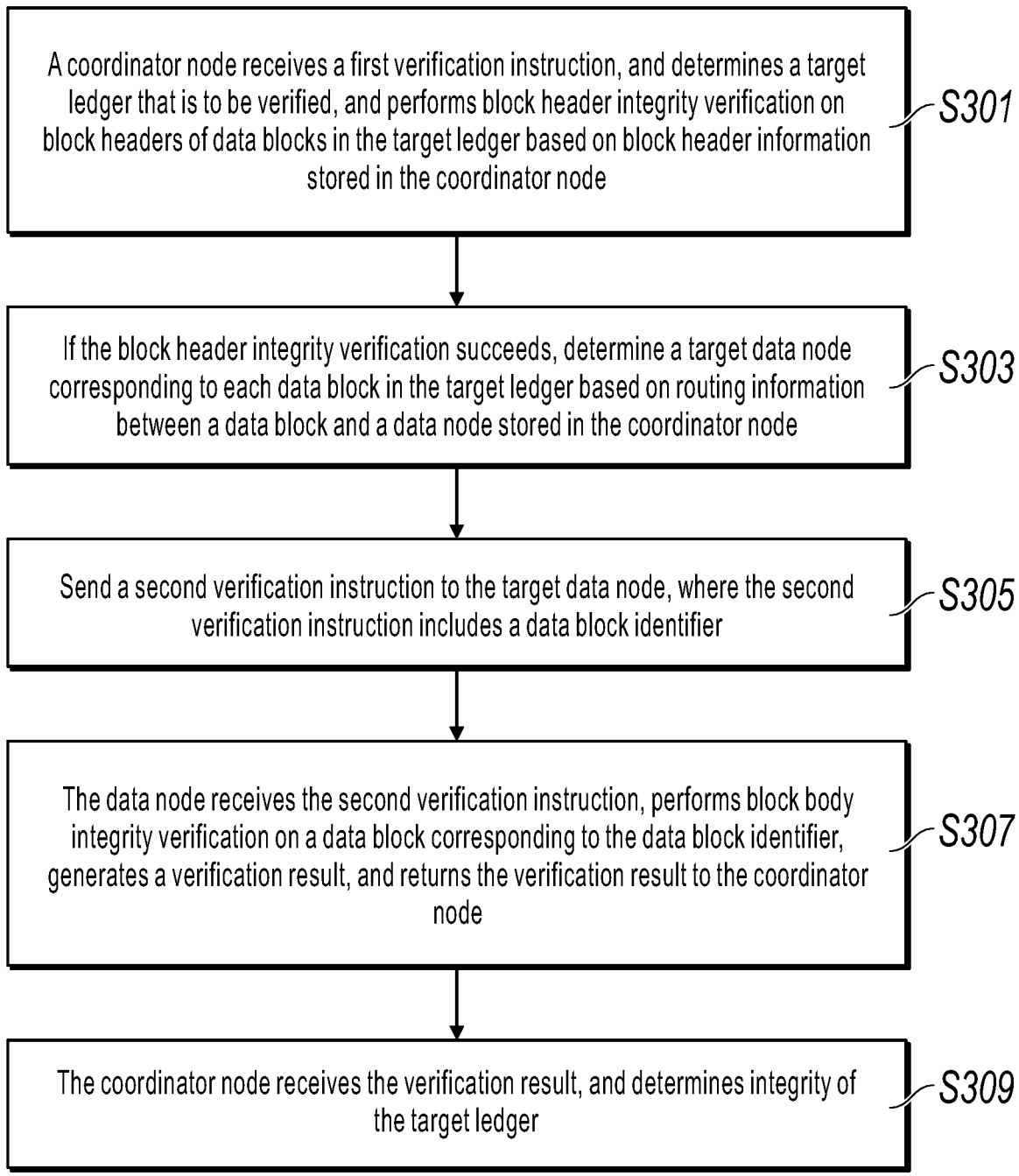
FIG. 3 is a schematic flowchart illustrating a data verification method applied to a database system, according to an implementation of the present specification.

Based on the previously storage method, the database system can perform parallel verification when receiving a verification instruction initiated by a user. FIG. 3 is a schematic flowchart illustrating a data verification method, according to an implementation of the present specification. The method is applied to a database system that stores blockchain-type ledgers in a centralized manner. The database system includes a coordinator node and data nodes. The method includes the following steps.

S301: The coordinator node receives a first verification instruction, and determines a target ledger that is to be verified, and performs block header integrity verification on block headers of data blocks in the target ledger based on block header information stored in the coordinator node, where the target ledger includes a full ledger or a partial ledger (i.e., a segment of the full ledger).

The first verification instruction here can be an operation instruction entered by a user, for example, VERIFY('khash', &v,−1). 'khash' is a hash value of a data block entered by the user. The system can determine a corresponding data block based on the hash value, so that all data blocks between the data block and "−1 data block" (that is, an initial data block) can be used as the target ledger. For another example, a user can directly input block heights of specified data blocks: VERIFY(1, 1000), so that the first 1000 data blocks can be used as the target ledger. For another example, a user can input specified time points VERIFY(T1, T2), so that data blocks generated between T1 and T2 can serve as the target ledger and be verified. In addition, the target ledger can alternatively be a current full ledger.

The verification here refers to integrity verification. As described above, in the implementation of the present specification, because a hash value of a data block is obtained based on both a hash value of a data record of the data block and a hash value of a previous data block, any change to the data record can cause a change to the hash value of the data block.

Therefore, the user can initiate integrity verification at any time to verify whether a data block is complete or correct by verifying whether a block hash of the data block stored in a block header is correct. A specific method is as follows: Starting from the first data block of the target ledger according to a generation sequence, a block hash of a current data block is generated based on a block hash of a previous data block and a root hash of a Merkle tree corresponding to a data record in the data block, and the generated block hash is compared with a block hash of the data block in pre-stored block header information. In the verification method at such a level of granularity, only the block header information is needed, and therefore the verification can be performed only on the coordinator node that stores the block header information.

S303: If the block header integrity verification succeeds, determine a target data node corresponding to each data block in the target ledger based on routing information between a data block and a data node stored in the coordinator node.

If the verification based on the block header information fails, it is clear that no further verification is needed, and an integrity verification failure can be returned.

After the block header integrity verification succeeds, block body internal integrity verification can be further performed. In the previously described storage method, specific data block information is not stored in the coordinator node, but is distributed in the data nodes. Therefore, further verification work needs to be allocated. Specifically, as the target ledger includes multiple data blocks, and related routing information is created for each data block when the data block is stored, a target data node corresponding to each data block can be separately determined. For any data block, a target data node refers to a data node that stores the data block.

Based on pre-stored routing information, the coordinator node can determined a specific data node that stores each data block. Therefore, multiple target data nodes can be separately determined, and the multiple target data nodes store all data blocks in the target ledger.

S305: Send a second verification instruction to the target data node, where the second verification instruction includes a data block identifier.

Further, for any determined target data node, the coordinator node can generate and send a corresponding second verification instruction. Each second verification instruction includes a data block identifier. A data block corresponding to the data block identifier should be stored in the target data node. The data block identifier can be a block height or a block hash of the data block, and should have the same type as a data block identifier stored in the data node.

In the previously described process, because there are multiple target data nodes, each data node receives one second verification instruction.

S307: The data node receives the second verification instruction, performs block body integrity verification on a data block corresponding to the data block identifier, generates a verification result, and returns the verification result to the coordinator node.

After receiving the second verification instruction, any data node can determine, based on the data block identifier, a data block that needs to be verified. A specific verification method is as follows: A hash value of each data record is obtained, a root hash value of a Merkle tree of the data record in the data block is obtained through calculation, and further a hash value of the data block is obtained through calculation based on a previously stored parent hash value, and is compared with a previously stored hash value of the data block. If the calculated hash value of the data block is the same as the previously stored hash value of the data block, the verification succeeds, or otherwise the verification fails, and a verification result is returned to the coordinator node.

S309: The coordinator node receives the verification result, and determines integrity of the target ledger.

The coordinator node can determine that the ledger is complete only when all verification results indicate successful verification. If any result indicates a verification failure, it can be determined that the ledger is incomplete.

According to the solutions provided in the implementations of the present specification, when a blockchain-type ledger needs to be verified, integrity verification can be first performed on block headers in a coordinator node only, and after the verification succeeds, a second verification instruction can be further distributed to data nodes, so that the data nodes perform data block internal verification in parallel, thereby largely improving verification efficiency.

In an implementation, the coordinator node can further perform block header integrity verification based on a time service certificate generated by a time authority. The time service certificate can be generated in advance in the following way: The coordinator node determines a target ledger that needs time service authentication, where the target ledger includes at least one data block or multiple data blocks with consecutive block heights; generates a Merkle tree corresponding to the target ledger based on a sequence of block heights of data blocks in the target ledger, and determines a root hash of the Merkle tree based on a block hash of each data block; sends the root hash of the Merkle tree and related information of the data blocks to a time authority, where the related information of the data blocks includes a start block height, an end block height, or a quantity of the data blocks; and receives a time service certificate that is returned by the time authority, where the time service certificate corresponds to the target ledger and includes a trusted timestamp and a time authority signature. The time service certificate can include a start data block height, an end data block height, a trusted timestamp, and a root hash of a partial ledger.

In other words, a time service certificate is used to confirm that a generation time of a segment of ledger is before a timestamp given by the time authority. For example, the time authority can be the National Time Service Center or a related time service institution authorized by the National Time Service Center.

The first verification instruction can include a time point or a time interval determined by two time points. The coordinator node can perform matching based on the time point in the first verification instruction and the trusted timestamp in the time service certificate. For example, when the first verification instruction includes one time point, a corresponding time service certificate can be a time service certificate with a minimum time interval between a trusted timestamp and the time point. When the first verification instruction includes a time interval determined by two time points, corresponding time service certificates can be all time service certificates with trusted timestamps falling into the time interval.

During block header integrity verification based on a time service certificate, a data block range for verification is determined by a start block height and an end block height that are included in the time service certificate. A verification method is as follows: constructing a Merkle tree from a start block height to an end block height, calculating a root hash, and comparing the calculated root hash with a root hash in the time service certificate.

When there are multiple time service certificates, block header integrity verification can be performed on partial ledgers corresponding to the time service certificates based on a sequence of trusted timestamps in the time service certificates.

In another implementation, the coordinator node receives a full verification instruction specific to a ledger. In this case, the full verification instruction does not need to include a time point, and the coordinator node can perform block header integrity verification on the full ledger based on all time service certificates.

Notably, because a time service certificate is also stored in the coordinator node, block header integrity verification based on a time service certificate can be performed only in the coordinator node, and no data node needs to be called.

In an implementation, before receiving the verification result returned by the data node for the data block, the coordinator node can generate an integrity array in the coordinator node to record verification results provided by the data nodes for the data blocks in the target ledger. When generating the verification result, the data node can return a feature value that represents a failure or a success. For example, 1 is returned for a verification success, and 0 is returned for a verification failure. Therefore, a value of an element in the integrity array is either 1 or 0. When a value of any element in the integrity array is 0, the coordinator node can determine that the verification fails. When values of elements in the integrity array are all 1s, the coordinator node can determine that the verification succeeds. Statistical collection of verification results can be more convenient by recording a verification status of each data block in the integrity array.

Correspondingly, an implementation of the present specification further provides a data verification system, which is applied to a database system that stores blockchain-type ledgers in a centralized manner. The database system includes a coordinator node and data nodes, where the coordinator node receives a first verification instruction, and determines a target ledger that is to be verified, and performs block header integrity verification on block headers of data blocks in the target ledger based on block header information stored in the coordinator node, where the target ledger includes a partial ledger or a full ledger; if the block header integrity verification succeeds, the coordinator node determines a target data node corresponding to each data block in the target ledger based on routing information between a data block and a data node stored in the coordinator node; and the coordinator node sends a second verification instruction to the target data node, where the second verification instruction includes a data block identifier; the data node receives the second verification instruction, performs block body integrity verification on a data block corresponding to the data block identifier, generates a verification result, and returns the verification result to the coordinator node; and the coordinator node receives the verification result, and determines integrity of the target ledger; where in the blockchain-type ledgers, a data block includes a block header used to store metadata and a block body used to store a data record; and except an initial data block, each data block includes at least one data record and includes its own block hash value that is determined by both the data record included in the data block and a hash value of a previous data block, and block heights of data blocks are increased monotonically based on a block generation time sequence.

Further, a data block is stored in advance in the database system in the following way: obtaining, by the coordinator node, a generated data block, determining a data node corresponding to the data block based on a block hash value of the data block, allocating the data block to the corresponding data node, creating routing information between the data block and the data node, and saving the routing information and block header information of the data block; and receiving and storing, by the data node, the data block sent by the coordinator node.

Further, in the database system, the coordinator node obtains a block header and a block body in the data block, and allocates the block body to the corresponding data node; and correspondingly, the coordinator node creates routing information between the block body and the data node; and correspondingly, the data node receives the block body sent by the coordinator node.

Further, a data block is generated in advance in the database system in the following way: receiving a data record to be stored, and determining a hash value of each data record; and when a predetermined block generation condition is reached, determining each data record to be written into a data block and generating the Nth data block that includes a hash value of the data block and the data record, specifically including: when N=1, giving a hash value and a block height of the initial data block based on a predetermined method; and when N>1, determining the hash value of the Nth data block based on each data record to be written into the data block and a hash value of the (N−1)th data block, and generating the Nth data block that includes the hash value of the Nth data block, each data record, and a block generation time of the data block, where block heights of data blocks are increased monotonically based on a block generation time sequence.

Further, in the database system, the coordinator node receives a time point included in the first verification instruction, obtains a time service certificate corresponding to the time point, and determines a partial ledger corresponding to the time service certificate as the target ledger, where the time service certificate includes a start data block height, an end data block height, a trusted timestamp, and a root hash of the corresponding partial ledger; and correspondingly, the coordinator node performs block header integrity verification on the partial ledger based on the time service certificate and the stored block header information.

Further, in the database system, before the coordinator node receives the verification result, the coordinator node generates an integrity array used to record verification results of the data blocks in the target ledger, where each element in the integrity array corresponds to one data block; and correspondingly, the data node generates the verification result, and returns the verification result to the coordinator node by generating, by the data node, a feature value that represents a verification failure or a verification success, and returning the feature value to the coordinator node; and correspondingly, the coordinator node receives the verification result, and determines the integrity of the target ledger by determining that the target ledger is incomplete when a value of any element in the integrity array is the feature value that represents a verification failure.

Figure 4:
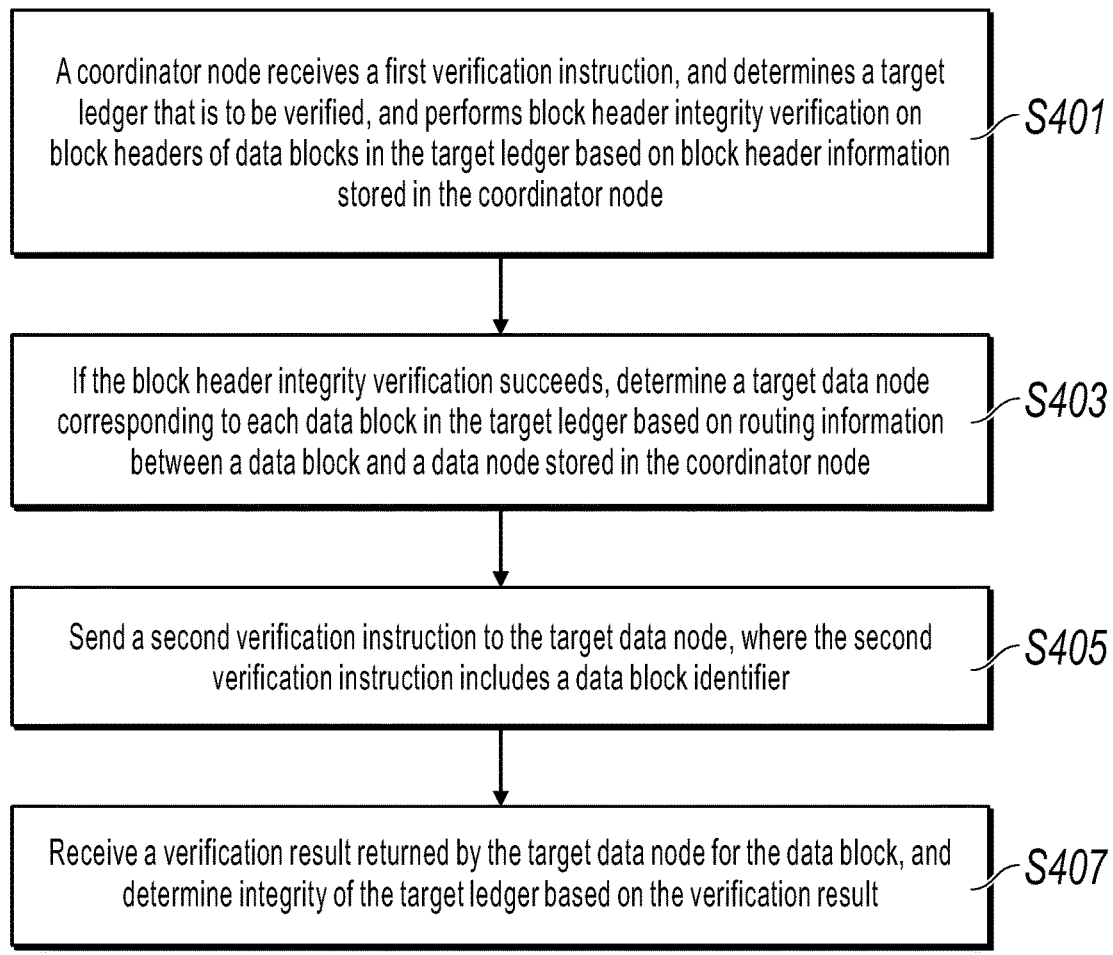
FIG. 4 is a schematic flowchart illustrating a data verification method applied to a coordinator node, according to an implementation of the present specification.

Correspondingly, an implementation of the present specification further provides a data verification method, which is applied to a coordinator node in a database system that stores blockchain-type ledgers in a centralized manner. FIG. 4 is a schematic flowchart illustrating a data verification method applied to the coordinator node, according to an implementation of the present specification. The method includes the following steps S401: Receive a first verification instruction, and determine a target ledger that is to be verified, and perform block header integrity verification on block headers of data blocks in the target ledger based on block header information stored in the coordinator node, where the target ledger includes a partial ledger or a full ledger.

S403: If the block header integrity verification succeeds, determine a target data node corresponding to each data block in the target ledger based on routing information between a data block and a data node stored in the coordinator node.

S405: Send a second verification instruction to the target data node, where the second verification instruction includes a data block identifier.

S407: Receive a verification result returned by the target data node for the data block, and determine integrity of the target ledger based on the verification result.

In the blockchain-type ledgers, a data block includes a block header used to store metadata and a block body used to store a data record; and except an initial data block, each data block includes at least one data record and includes its own block hash value that is determined by both the data record included in the data block and a hash value of a previous data block, and block heights of data blocks are increased monotonically based on a block generation time sequence.

Figure 5:
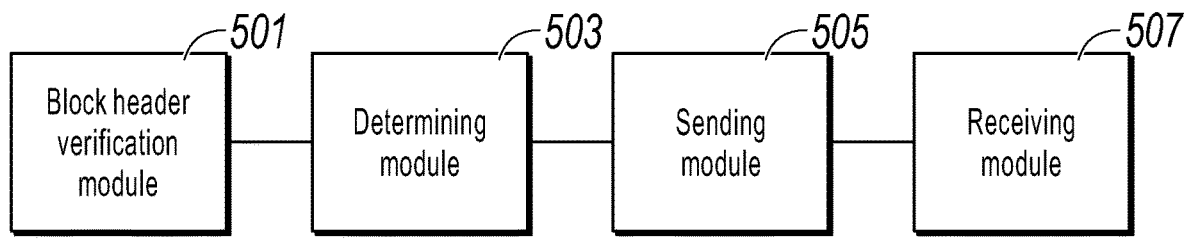
FIG. 5 is a schematic structural diagram illustrating a data verification apparatus applied to a coordinator node, according to an implementation of the present specification.

Correspondingly, an implementation of the present specification further provides a data verification apparatus, which is applied to a coordinator node in a database system that stores blockchain-type ledgers in a centralized manner. FIG. 5 is a schematic structural diagram illustrating a data verification apparatus applied to the coordinator node, according to an implementation of the present specification. The apparatus includes the following: a block header verification module 501, configured to receive a first verification instruction, and determine a target ledger that is to be verified, and perform block header integrity verification on block headers of data blocks in the target ledger based on block header information stored in the coordinator node, where the target ledger includes a partial ledger or a full ledger; a determining module 503, configured to, if the block header integrity verification succeeds, determine a target data node corresponding to each data block in the target ledger based on routing information between a data block and a data node stored in the coordinator node; a sending module 505, configured to send a second verification instruction to the target data node, where the second verification instruction includes a data block identifier; and a receiving module 507, configured to receive a verification result returned by the target data node for the data block, and determine integrity of the target ledger based on the verification result.

In the blockchain-type ledgers, a data block includes a block header used to store metadata and a block body used to store a data record; and except an initial data block, each data block includes at least one data record and includes its own block hash value that is determined by both the data record included in the data block and a hash value of a previous data block, and block heights of data blocks are increased monotonically based on a block generation time sequence.

An implementation of the present specification further provides a computer device. The computer device includes at least a memory, a processor, and a computer program that is stored in the memory and that can run on the processor. When executing the program, the processor performs the data verification method shown in FIG. 4.

Figure 6:
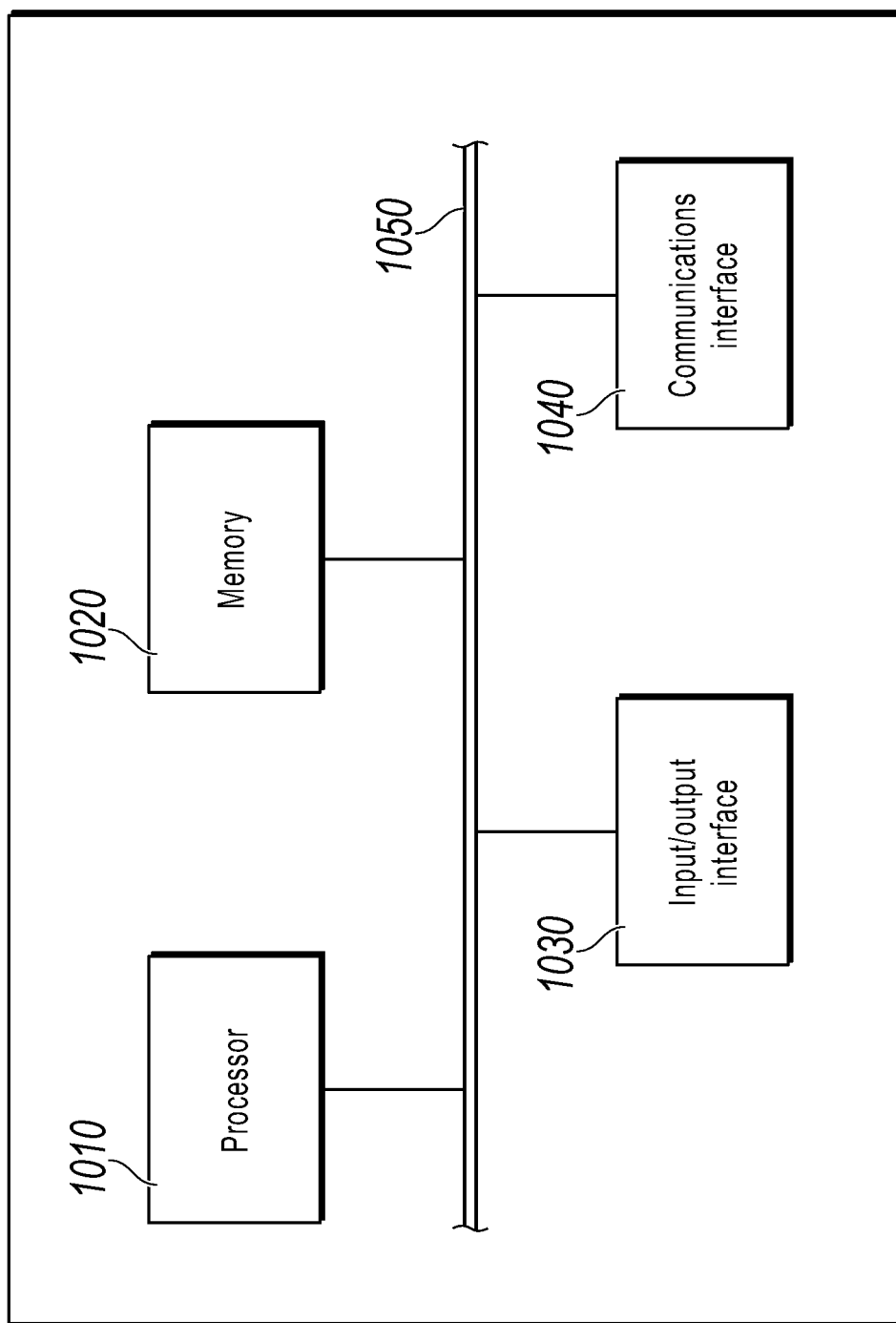
FIG. 6 is a schematic structural diagram illustrating a device for configuring a method in an implementation of the present specification.

FIG. 6 is a more detailed schematic structural diagram illustrating a hardware structure of a computing device, according to an implementation of the present specification. The device can include a processor 1010, a memory 1020, an input/output interface 1030, a communications interface 1040, and a bus 1050. The processor 1010, the memory 1020, the input/output interface 1030, and the communications interface 1040 are connected to and communicate with each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, so as to implement the technical solutions provided in the implementations of the present specification.

The memory 1020 can be implemented by using a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is called and executed by the processor 1010.

The input/output interface 1030 is configured to connect to an input/output device, to input or output information. The input/output device (not shown in the figure) can be used as a component and configured in the device, or can be externally connected to the device, to provide a corresponding function. The input device can include a keyboard, a mouse, a touchscreen, a microphone, various sensors, etc. The output device can include a display, a speaker, a vibrator, an indicator, etc.

The communications interface 1040 is configured to connect to a communications module (not shown in the figure), to implement communication interaction between the device and another device. The communications module can perform communication by using a wired (for example, USB or a network cable) or wireless (for example, a mobile network, Wi-Fi, or Bluetooth) method.

The bus 1050 includes one channel, used to transmit information between components (for example, the processor 1010, the memory 1020, the input/output interface 1030, and the communications interface 1040) of the device.

Notably, although only the processor 1010, the memory 1020, the input/output interface 1030, the communications interface 1040, and the bus 1050 of the device are shown, during specific implementation, the device can further include other components necessary for normal running. In addition, a person skilled in the art can understand that the device can include only components necessary for implementing the solutions in the implementations of the present specification, but does not necessarily include all components shown in the figure.

An implementation of the present specification further provides a computer readable storage medium. The computer readable storage medium stores a computer program, and when executed by a processor, the program can implement the data verification method shown in FIG. 4.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media (transitory media) such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, an apparatus implementation is similar to a method implementation, and therefore is described briefly. For a related part, references can be made to some descriptions in the method implementation. The previously described apparatus implementations are merely examples. The modules described as separate parts can or cannot be physically separate. During implementation of the solutions in the implementations of the present specification, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present specification. It should be noted that a person of ordinary skill in the art can further make several improvements or polishing without departing from the principle of the implementations of the present specification, and the improvements or polishing shall fall within the protection scope of the implementations of the present specification.

What is claimed is:

1. A computer-implemented method for data verification, comprising:

receiving, by a coordinator node in a database system that stores data in blockchain-type ledgers in a centralized manner, a first verification instruction, wherein the database system comprises the coordinator node and one or more data nodes;

determining, by the coordinator node and based on the first verification instruction, a target ledger that is to be verified, wherein the target ledger comprises a blockchain-type ledger that stores a plurality of data blocks, wherein in the blockchain-type ledger, each data block of the plurality of data blocks comprises a corresponding block header used to store corresponding metadata and a corresponding block body used to store corresponding data records, wherein except an initial data block, each data block of the plurality of data blocks comprises at least one data record and a corresponding hash value that is determined by both the at least one data record and a hash value of a previous data block, and wherein block heights of the plurality of data blocks increase monotonically according to a block generation time sequence;

performing, by the coordinator node and based on block header information stored in the coordinator node, block header integrity verification on block headers of the plurality of data blocks in the target ledger, wherein the block header information comprises information of the corresponding block header of each data block of the plurality of data blocks in the target ledger, and wherein performing the block header integrity verification on the block headers of the plurality of data blocks in the target ledger comprises:

for each data block of the plurality of data blocks in the target ledger,
comparing the corresponding hash value of each data block of the plurality of data blocks in the block header information with a hash value generated using the corresponding data records associated with each data block of the plurality of data blocks;

determining, by the coordinator node, if the block header integrity verification succeeds;

if the block header integrity verification fails:
refraining, by the coordinator node, from further integrity verification of the target ledger; and
generating, by the coordinator node, an indicator indicating that integrity of the target ledger has been compromised; and if the block header integrity verification succeeds;
determining, by the coordinator node and for each data block of the plurality of data blocks in the target ledger, a corresponding target data node in the database system based on routing information stored in the coordinator node, wherein the routing information comprises mapping relationship between each data block of the plurality of data blocks in the target ledger and a corresponding data node in the database system;
sending, by the coordinator node and to each target data node in the database system, a corresponding second verification instruction, wherein each target data node stores a corresponding data block of the plurality of data blocks in the target ledger, and wherein the corresponding second verification instruction comprises a corresponding data block identifier associated with the corresponding data block of the plurality of data blocks in the target ledger;
receiving, by the coordinator node and from each target data node, a corresponding verification result, wherein each target data node is associated with the corresponding second verification instruction, wherein the corresponding verification result is of block body integrity verification on a data block corresponding to a data block identifier comprised in the corresponding second verification instruction; and
determining, by the coordinator node, the integrity of the target ledger based on the corresponding verification result received from each target data node.

2. The computer-implemented method according to claim 1, wherein each data block of the plurality of data blocks in the target ledger is stored in advance in the database system by:
obtaining, by the coordinator node, each data block of the plurality of data blocks in the target ledger;
determining, by the coordinator node, the corresponding data node in the database system corresponding to each data block based on the corresponding hash value of each data block;
allocating, by the coordinator node, each data block to the corresponding data node;
creating, by the coordinator node, corresponding routing information between each data block and the corresponding data node;
saving, by the coordinator node, the corresponding routing information between each data block and the corresponding data node and block header information of each data block; and
sending, by the coordinator node and to the corresponding data node, each data block to be stored by the corresponding data node.

3. The computer-implemented method according to claim 2, wherein the allocating, by the coordinator node, each data block to the corresponding data node comprises:
obtaining, by the coordinator node, the corresponding block header and the corresponding block body in each data block; and
allocating, by the coordinator node, the corresponding block body to the corresponding data node,
wherein the creating, by the coordinator node, the corresponding routing information between each data block and the corresponding data node comprises creating, by the coordinator node, the corresponding routing information between the corresponding block body and the corresponding data node,
and wherein the sending, by the coordinator node and to the corresponding data node, each data block to be stored by the corresponding data node comprises sending, by the coordinator node and to the corresponding data node, the corresponding block body to be stored by the corresponding data node.

4. The computer-implemented method according to claim 2, wherein each data block is generated in advance in the database system by:
receiving data records to be written in an Nth data block;
determining a hash value of the data records; and
if a predetermined block generation condition is reached, determining the data records; and
generating the Nth data block that comprises the data records and the hash value of the data records.

5. The computer-implemented method according to claim 4, wherein generating the Nth data block that comprises the data records and the hash value of the data records comprises:
if N=1, setting a hash value and a block height of the initial data block based on a predetermined methodology; and
if N>1,
determining a hash value of the Nth data block based on the data records to be written into the Nth data block and a hash value of a (N−1)th data block; and
generating the Nth data block that comprises the hash value of the Nth data block, the data records to be written into the Nth data block, and a block generation time of the Nth data block.

6. The computer-implemented method according to claim 1, wherein the receiving the first verification instruction, and determining the target ledger comprises:
receiving a time point comprised in the first verification instruction;
obtaining a time service certificate corresponding to the time point; and
determining a partial ledger corresponding to the time service certificate as the target ledger, wherein the time service certificate comprises a start data block height, an end data block height, a trusted timestamp, and a root hash of the partial ledger,
and wherein performing the block header integrity verification on the block headers of the plurality of data blocks in the target ledger based on the block header information stored in the coordinator node comprises performing the block header integrity verification on the partial ledger based on the time service certificate and the block header information.

7. The computer-implemented method according to claim 1, wherein before the receiving the corresponding verification result from each target data node, the computer-implemented method further comprises:
generating, by the coordinator node, an integrity array comprising verification results of the plurality of data blocks in the target ledger, wherein each element in the integrity array corresponds to a respective data block of the plurality of data blocks in the target ledger,
wherein the corresponding verification result from each target data node comprises a corresponding feature value that comprises one of a verification failure and a verification success,
and wherein the determining, by the coordinator node, the integrity of the target ledger based on the corresponding verification result received from each target data node comprises determining, by the coordinator node, that the target ledger is incomplete if a value of an element in the integrity array comprises a feature value that comprises a verification failure.

8. A non-transitory, computer-readable medium storing one or more instructions executable by a computer system to perform operations comprising:
receiving, by a coordinator node in a database system that stores data in blockchain-type ledgers in a centralized manner, a first verification instruction, wherein the database system comprises the coordinator node and one or more data nodes;
determining, by the coordinator node and based on the first verification instruction, a target ledger that is to be verified, wherein the target ledger comprises a blockchain-type ledger that stores a plurality of data blocks, wherein in the blockchain-type ledger, each data block of the plurality of data blocks comprises a corresponding block header used to store corresponding metadata and a corresponding block body used to store corresponding data records, wherein except an initial data block, each data block of the plurality of data blocks comprises at least one data record and a corresponding hash value that is determined by both the at least one data record and a hash value of a previous data block, and wherein block heights of the plurality of data blocks increase monotonically according to a block generation time sequence;
performing, by the coordinator node and based on block header information stored in the coordinator node, block header integrity verification on block headers of the plurality of data blocks in the target ledger, wherein the block header information comprises information of the corresponding block header of each data block of the plurality of data blocks in the target ledger, and wherein performing the block header integrity verification on the block headers of the plurality of data blocks in the target ledger comprises:
for each data block of the plurality of data blocks in the target ledger,
comparing the corresponding hash value of each data block of the plurality of data blocks in the block header information with a hash value generated using the corresponding data records associated with each data block of the plurality of data blocks;
determining, by the coordinator node, if the block header integrity verification succeeds;
if the block header integrity verification fails:
refraining, by the coordinator node, from further integrity verification of the target ledger; and
generating, by the coordinator node, an indicator indicating that integrity of the target ledger has been compromised; and
if the block header integrity verification succeeds:
determining, by the coordinator node and for each data block of the plurality of data blocks in the target ledger, a corresponding target data node in the database system based on routing information stored in the coordinator node, wherein the routing information comprises mapping relationship between each data block of the plurality of data blocks in the target ledger and a corresponding data node in the database system;
sending, by the coordinator node and to each target data node in the database system, a corresponding second verification instruction, wherein each target data node stores a corresponding data block of the plurality of data blocks in the target ledger, and wherein the corresponding second verification instruction comprises a corresponding data block identifier associated with the corresponding data block of the plurality of data blocks in the target ledger;
receiving, by the coordinator node and from each target data node, a corresponding verification result, wherein each target data node is associated with the corresponding second verification instruction, wherein the corresponding verification result is of block body integrity verification on a data block corresponding to a data block identifier comprised in the corresponding second verification instruction; and
determining, by the coordinator node, the integrity of the target ledger based on the corresponding verification result received from each target data node.

9. The non-transitory, computer-readable medium according to claim 8, wherein each data block of the plurality of data blocks in the target ledger is stored in advance in the database system by:
obtaining, by the coordinator node, each data block of the plurality of data blocks in the target ledger;
determining, by the coordinator node, the corresponding data node in the database system corresponding to each data block based on the corresponding hash value of each data block;

allocating, by the coordinator node, each data block to the corresponding data node;

creating, by the coordinator node, corresponding routing information between each data block and the corresponding data node;

saving, by the coordinator node, the corresponding routing information between each data block and the corresponding data node and block header information of each data block; and sending, by the coordinator node and to the corresponding data node, each data block to be stored by the corresponding data node.

10. The non-transitory, computer-readable medium according to claim 9, wherein the allocating, by the coordinator node, each data block to the corresponding data node comprises:

obtaining, by the coordinator node, the corresponding block header and the corresponding block body in each data block; and allocating, by the coordinator node, the corresponding block body to the corresponding data node, wherein the creating, by the coordinator node, the corresponding routing information between each data block and the corresponding data node comprises creating, by the coordinator node, the corresponding routing information between the corresponding block body and the corresponding data node, and wherein the sending, by the coordinator node and to the corresponding data node, each data block to be stored by the corresponding data node comprises sending, by the coordinator node and to the corresponding data node, the corresponding block body to be stored by the corresponding data node.

11. The non-transitory, computer-readable medium according to claim 9, wherein each data block is generated in advance in the database system by:

receiving data records to be written in an Nth data block;
determining a hash value of the data records; and
if a predetermined block generation condition is reached,
determining the data records; and
generating the Nth data block that comprises the data records and the hash value of the data records.

12. The non-transitory, computer-readable medium according to claim 11, wherein generating the Nth data block that comprises the data records and the hash value of the data records comprises:

if N=1, setting a hash value and a block height of the initial data block based on a predetermined methodology; and if N>1,
determining a hash value of the Nth data block based on the data records to be written into the Nth data block and a hash value of a (N−1)th data block; and generating the Nth data block that comprises the hash value of the Nth data block, the data records to be written into the Nth data block, and a block generation time of the Nth data block.

13. The non-transitory, computer-readable medium according to claim 8, wherein the receiving the first verification instruction, and determining the target ledger comprises:

receiving a time point comprised in the first verification instruction;
obtaining a time service certificate corresponding to the time point; and
determining a partial ledger corresponding to the time service certificate as the target ledger, wherein the time service certificate comprises a start data block height, an end data block height, a trusted timestamp, and a root hash of the partial ledger, and wherein performing the block header integrity verification on the block headers of the plurality of data blocks in the target ledger based on the block header information stored in the coordinator node comprises performing the block header integrity verification on the partial ledger based on the time service certificate and the block header information.

14. The non-transitory, computer-readable medium according to claim 8, wherein before the receiving the corresponding verification result from each target data node, the operations further comprises:

generating, by the coordinator node, an integrity array comprising verification results of the plurality of data blocks in the target ledger, wherein each element in the integrity array corresponds to a respective data block of the plurality of data blocks in the target ledger, wherein the corresponding verification result from each target data node comprises a corresponding feature value that comprises one of a verification failure and a verification success, and wherein the determining, by the coordinator node, the integrity of the target ledger based on the corresponding verification result received from each target data node comprises determining, by the coordinator node, that the target ledger is incomplete if a value of an element in the integrity array comprises a feature value that comprises a verification failure.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, by a coordinator node in a database system that stores data in blockchain-type ledgers in a centralized manner, a first verification instruction, wherein the database system comprises the coordinator node and one or more data nodes;

determining, by the coordinator node and based on the first verification instruction, a target ledger that is to be verified, wherein the target ledger comprises a blockchain-type ledger that stores a plurality of data blocks, wherein in the blockchain-type ledger, each data block of the plurality of data blocks comprises a corresponding block header used to store corresponding metadata and a corresponding block body used to store corresponding data records, wherein except an initial data block, each data block of the plurality of data blocks comprises at least one data record and a corresponding hash value that is determined by both the at least one data record and a hash value of a previous data block, and wherein block heights of the plurality of data blocks increase monotonically according to a block generation time sequence;

performing, by the coordinator node and based on block header information stored in the coordinator node, block header integrity verification on block headers of the plurality of data blocks in the target ledger, wherein the block header information comprises information of the corresponding block header of each data block of the plurality of data blocks in the target ledger, and wherein performing the block header integrity verification on the block headers of the plurality of data blocks in the target ledger comprises:

for each data block of the plurality of data blocks in the target ledger,
comparing the corresponding hash value of each data block of the plurality of data blocks in the block header information with a hash value generated using the corresponding data records associated with each data block of the plurality of data blocks;
determining, by the coordinator node, if the block header integrity verification succeeds;
if the block header integrity verification fails:
refraining, by the coordinator node, from further integrity verification of the target ledger; and
generating, by the coordinator node, an indicator indicating that integrity of the target ledger has been compromised; and
if the block header integrity verification succeeds:
determining, by the coordinator node and for each data block of the plurality of data blocks in the target ledger, a corresponding target data node in the database system based on routing information stored in the coordinator node, wherein the routing information comprises mapping relationship between each data block of the plurality of data blocks in the target ledger and a corresponding data node in the database system;
sending, by the coordinator node and to each target data node in the database system, a corresponding second verification instruction, wherein each target data node stores a corresponding data block of the plurality of data blocks in the target ledger, and wherein the corresponding second verification instruction comprises a corresponding data block identifier associated with the corresponding data block of the plurality of data blocks in the target ledger;
receiving, by the coordinator node and from each target data node, a corresponding verification result, wherein each target data node is associated with the corresponding second verification instruction, wherein the corresponding verification result is of block body integrity verification on a data block corresponding to a data block identifier comprised in the corresponding second verification instruction; and
determining, by the coordinator node, the integrity of the target ledger based on the corresponding verification result received from each target data node.

16. The computer-implemented system according to claim 15, wherein each data block of the plurality of data blocks in the target ledger is stored in advance in the database system by:
obtaining, by the coordinator node, each data block of the plurality of data blocks in the target ledger;
determining, by the coordinator node, the corresponding data node in the database system corresponding to each data block based on the corresponding hash value of each data block;
allocating, by the coordinator node, each data block to the corresponding data node;
creating, by the coordinator node, corresponding routing information between each data block and the corresponding data node;
saving, by the coordinator node, the corresponding routing information between each data block and the corresponding data node and block header information of each data block; and
sending, by the coordinator node and to the corresponding data node, each data block to be stored by the corresponding data node.

17. The computer-implemented system according to claim 16, wherein the allocating, by the coordinator node, each data block to the corresponding data node comprises:
obtaining, by the coordinator node, the corresponding block header and the corresponding block body in each data block; and
allocating, by the coordinator node, the corresponding block body to the corresponding data node,
wherein the creating, by the coordinator node, the corresponding routing information between each data block and the corresponding data node comprises creating, by the coordinator node, the corresponding routing information between the corresponding block body and the corresponding data node,
and wherein the sending, by the coordinator node and to the corresponding data node, each data block to be stored by the corresponding data node comprises sending, by the coordinator node and to the corresponding data node, the corresponding block body to be stored by the corresponding data node.

18. The computer-implemented system according to claim 16, wherein each data block is generated in advance in the database system by:
receiving data records to be written in an Nth data block;
determining a hash value of the data records; and
if a predetermined block generation condition is reached, determining the data records; and
generating the Nth data block that comprises the data records and the hash value of the data records, wherein generating the Nth data block that comprises the data records and the hash value of the data records comprises:
if N=1, setting a hash value and a block height of the initial data block based on a predetermined methodology; and
if N>1,
determining a hash value of the Nth data block based on the data records to be written into the Nth data block and a hash value of a (N−1)th data block; and
generating the Nth data block that comprises the hash value of the Nth data block, the data records to be written into the Nth data block, and a block generation time of the Nth data block.

19. The computer-implemented system according to claim 15, wherein the receiving the first verification instruction, and determining the target ledger comprises:
receiving a time point comprised in the first verification instruction;
obtaining a time service certificate corresponding to the time point; and
determining a partial ledger corresponding to the time service certificate as the target ledger, wherein the time service certificate comprises a start data block height, an end data block height, a trusted timestamp, and a root hash of the partial ledger, and wherein performing the block header integrity verification on the block headers of the plurality of data blocks in the target ledger based on the block header information stored in the coordinator node comprises performing the block header integrity verification on the partial ledger based on the time service certificate and the block header information.

20. The computer-implemented system according to claim 15, wherein before the receiving the corresponding verification result from each target data node, the one or more operations further comprises:
   generating, by the coordinator node, an integrity array comprising verification results of the plurality of data blocks in the target ledger, wherein each element in the integrity array corresponds to a respective data block of the plurality of data blocks in the target ledger,
   wherein the corresponding verification result from each target data node comprises a corresponding feature value that comprises one of a verification failure and a verification success,
   and wherein the determining, by the coordinator node, the integrity of the target ledger based on the corresponding verification result received from each target data node comprises determining, by the coordinator node, that the target ledger is incomplete if a value of an element in the integrity array comprises a feature value that comprises a verification failure.

\* \* \* \* \*